US011930344B2

(12) United States Patent
Kim

(10) Patent No.: US 11,930,344 B2
(45) Date of Patent: Mar. 12, 2024

(54) AUDIO DEVICE FOR OUTPUTTING SOUND HAVING UNIFORM SOUND QUALITY

(71) Applicant: SAMSUNG ELECTRONICS CO., LTD., Suwon-si (KR)

(72) Inventor: Oanjin Kim, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 351 days.

(21) Appl. No.: 17/414,835

(22) PCT Filed: Dec. 17, 2019

(86) PCT No.: PCT/KR2019/017912
§ 371 (c)(1),
(2) Date: Jun. 16, 2021

(87) PCT Pub. No.: WO2020/130590
PCT Pub. Date: Jun. 25, 2020

(65) Prior Publication Data

US 2022/0021982 A1 Jan. 20, 2022

(30) Foreign Application Priority Data

Dec. 17, 2018 (KR) ........................ 10-2018-0162787

(51) Int. Cl.
*H04R 9/06* (2006.01)
*H04R 3/00* (2006.01)

(52) U.S. Cl.
CPC ................. *H04R 9/06* (2013.01); *H04R 3/00* (2013.01)

(58) Field of Classification Search
CPC .......... H04R 1/288; H04R 1/025; H04R 3/00; H04R 7/12; H04R 7/18; H04R 9/025;
(Continued)

(56) References Cited

U.S. PATENT DOCUMENTS 7,050,594 B2 5/2006 Nakada et al.
8,577,076 B2 11/2013 Ohashi et al.
(Continued)

FOREIGN PATENT DOCUMENTS

KR 1019930011742 B1 12/1993
KR 101307430 B1 9/2013
(Continued)

OTHER PUBLICATIONS

International Written Opinion dated Apr. 6, 2020 issued by the International Searching Authority in counterpart International Application No. PCT/KR2019/017912 (PCT/ISA/237).
(Continued)

*Primary Examiner* — Carolyn R Edwards
*Assistant Examiner* — Julie X Dang
(74) *Attorney, Agent, or Firm* — Sughrue Mion, PLLC

(57) ABSTRACT

An audio device according to an embodiment set forth in the present document comprises: a housing comprising a first surface, a second surface that faces the first surface, and side surfaces that surround the space between the first surface and the second surface; a vibration element disposed on the first surface; a microphone which acquires sound generated by the vibration of an external object by the vibration element; a printed circuit board disposed inside the housing; a processor disposed on the printed circuit board; and a communication circuit which is electrically connected to the processor, and receives a first audio signal from an external electronic device, wherein the processor, when the vibration element is attached to an external object, generates a second audio signal such that the vibration element vibrates the external object, causes the microphone to acquire a third audio signal generated by the vibration of the external object, corrects the first audio signal on the basis of the deviation between the second audio signal and the third
(Continued)

audio signal, and can make the vibration element vibrate the external object on the basis of the corrected first audio signal. Various other embodiments inferred from the specification are also possible.

13 Claims, 8 Drawing Sheets

(58) Field of Classification Search
CPC .... H04R 9/046; H04R 9/06; H04R 2201/021; H04R 2400/11
See application file for complete search history.

(56) References Cited

U.S. PATENT DOCUMENTS

| | | | | |
|---|---|---|---|---|
| 10,749,560 | B2 | 8/2020 | Kim et al. | |
| 2003/0021427 | A1 | 1/2003 | Nakada et al. | |
| 2006/0112754 | A1* | 6/2006 | Yamamoto | G01C 22/006 73/1.38 |
| 2012/0008818 | A1 | 1/2012 | Ohashi et al. | |
| 2014/0168170 | A1* | 6/2014 | Lazarescu | G06F 3/043 345/177 |
| 2015/0350401 | A1* | 12/2015 | Nishioka | H04M 1/72513 455/426.1 |
| 2017/0251323 | A1* | 8/2017 | Jo | H04S 5/005 |
| 2019/0115944 | A1 | 4/2019 | Kim et al. | |
| 2019/0179594 | A1* | 6/2019 | Alameh | G06F 3/167 |
| 2019/0204408 | A1* | 7/2019 | Booij | H04B 11/00 |
| 2020/0252722 | A1* | 8/2020 | Mamou-Mani | H04R 3/04 |

FOREIGN PATENT DOCUMENTS

| | | | |
|---|---|---|---|
| KR | 10-2016-0043161 | A | 4/2016 |
| KR | 10-1646646 | B1 | 8/2016 |
| KR | 10-2017-0121029 | A | 11/2017 |
| KR | 10-1800575 | B1 | 11/2017 |

OTHER PUBLICATIONS

International Search Report dated Apr. 6, 2020 issued by the International Searching Authority in counterpart International Application No. PCT/KR2019/017912 (PCT/ISA/210).
Communication dated Oct. 18, 2022 issued by the Korean Intellectual Property Office in Korean Application No. 10-2018-0162787.
Communication dated Apr. 26, 2023 from the Korean Intellectual Property Office in KR Patent Application No. 10-2018-0162787.

* cited by examiner

AUDIO DEVICE FOR OUTPUTTING SOUND HAVING UNIFORM SOUND QUALITY

TECHNICAL FIELD

Embodiments disclosed in the disclosure relate to technologies for outputting a sound of uniform sound quality.

BACKGROUND ART

As there has been an increase in the request for better sound quality, recently, technologies associated with a method for playing an audio signal have been actively developed. Particularly, as an exciter type speaker makes the surface to the audio device is attached vibrate to output a sound, a user may enjoy more stereoscopic and vivid content.

DISCLOSURE

Technical Problem

As an exciter type speaker makes the attachment surface vibrate to output a sound, a different sound may be output according to a characteristic of the attachment surface. For example, a sound of a low-frequency band may be output as the attachment surface is well bent, and a sound of an intermediate- or high-frequency band may be output as density of the attachment surface is higher. Thus, because a user should find a suitable attachment surface and attachment location whenever the exciter type speaker moves, it may be uncomfortable.

Embodiments disclosed in the disclosure are to provide an audio device for addressing the above-mentioned problems or problems raised in the disclosure.

Technical Solution

In accordance with an aspect of the disclosure, an audio device is provided. The audio device may include a housing including a first surface, a second surface opposite to the first surface, and a side surface surrounding a space between the first surface and the second surface, a vibration element disposed on the first surface, a microphone configured to obtain a sound generated as the vibration element makes an external object vibrate, a PCB disposed in the housing, a processor disposed on the PCB; and a communication circuit configured to be electrically connected with the processor and receive a first audio signal from an external electronic device. The processor may be configured to generate a second audio signal, such that the vibration element makes the external object vibrate, when the vibration element is attached to the external object, allow the microphone to obtain a third audio signal generated as the external object vibrates, correct the first audio signal based on a deviation between the second audio signal and the third audio signal, and allow the vibration element to make the external object vibrate based on the corrected first audio signal.

In accordance with another aspect of the disclosure, an audio device is provided. The audio device may include a housing including a first surface, a second surface opposite to the first surface, and a side surface surrounding a space between the first surface and the second surface, a vibration element disposed on the first surface, a microphone configured to obtain a sound generated as the vibration element makes an external object vibrate, a PCB disposed in the housing, a processor disposed on the PCB, a communication circuit configured to be electrically connected with the processor and receive a first audio signal from an external electronic device, and an operation mode selection device configured to obtain a user input. The processor may be configured to generate a second audio signal, such that the vibration element makes the external object vibrate, when the user input corresponds to an analysis mode for correcting the first audio signal, allow the microphone to obtain a third audio signal generated as the external object vibrates, correct the first audio signal based on a deviation between the second audio signal and the third audio signal, and allow the vibration element to make the external object vibrate based on the corrected first audio signal.

In accordance with another aspect of the disclosure, a method for playing an audio signal is provided. The method may include receiving a first audio signal, generating a second audio signal and controlling such that a vibration element makes an external object vibrate, when the vibration element is attached to the external object, obtaining a third audio signal generated as the external object vibrates, correcting the first audio signal based on a deviation between the second audio signal and the third audio signal, and controlling such that the vibration element makes the external object vibrate based on the corrected first audio signal.

Advantageous Effects

According to embodiments disclosed in the disclosure, a sound of uniform sound quality may be output.

In addition, various effects ascertained directly or indirectly through the disclosure may be provided.

MODE FOR INVENTION

Hereinafter, various embodiments of the disclosure may be described with reference to accompanying drawings. However, it should be understood that this is not intended to limit the present disclosure to specific implementation forms and includes various modifications, equivalents, and/or alternatives of embodiments of the present disclosure. With regard to description of drawings, similar denotations may be used for similar components.

Figure 1A:
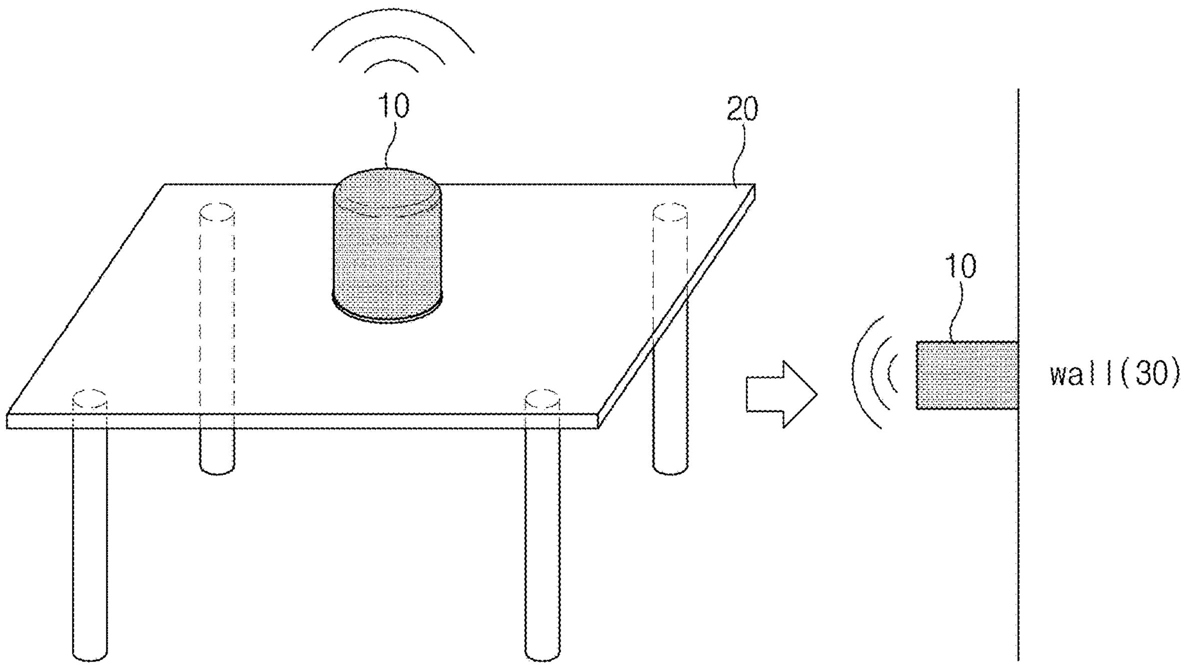
FIG. 1A illustrates an operation environment of an audio device according to a comparison example.
Figure 1B:
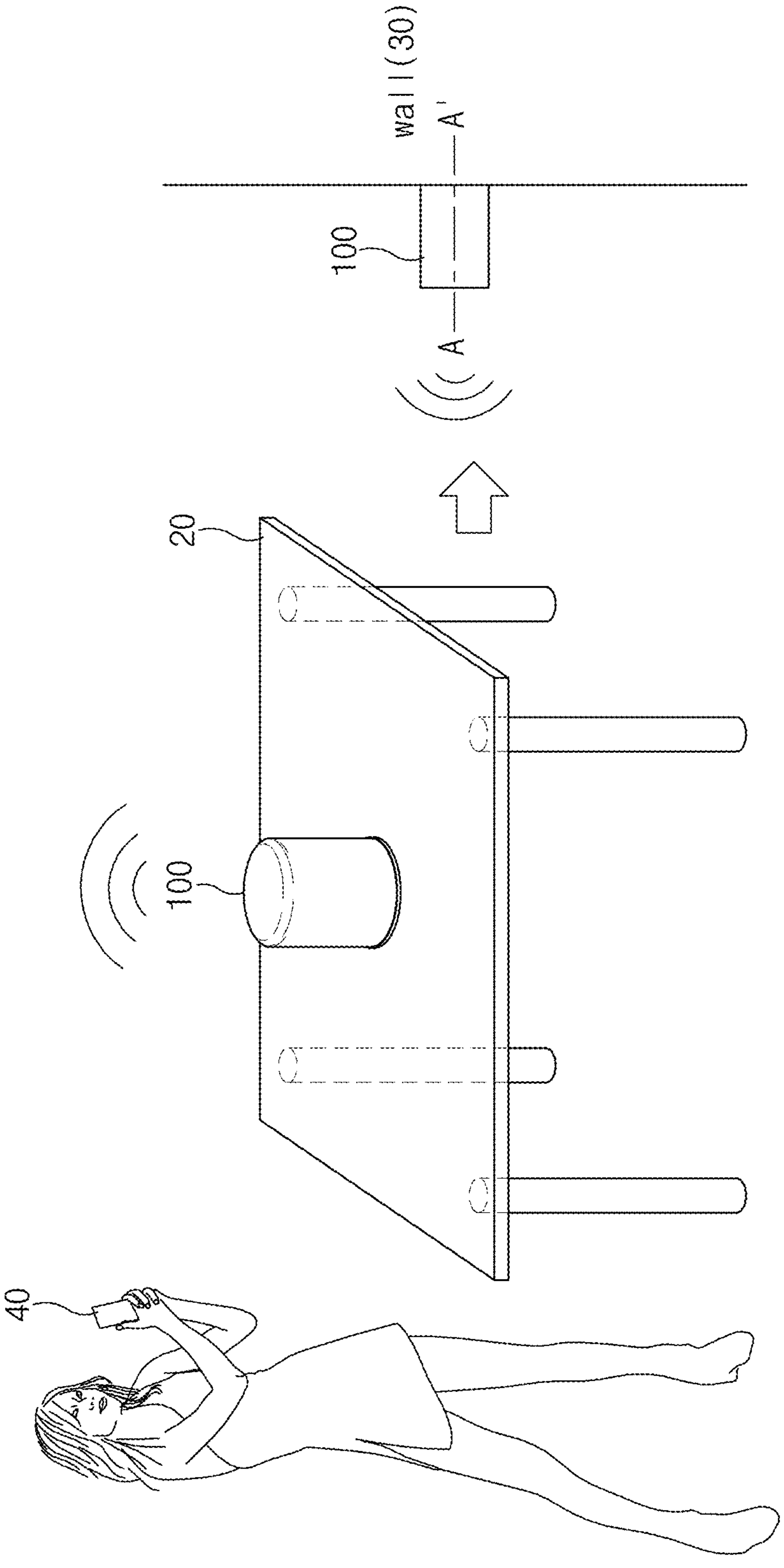
FIG. 1B illustrates an operation environment of an audio device according to an embodiment of the disclosure.

FIG. 1A illustrates an operation environment of an audio device according to a comparison example. FIG. 1B illustrates an operation environment of an audio device according to an embodiment of the disclosure.

Referring to FIG. 1A, an audio device 10 according to a comparison example may be attached to an external object 20 or 30. The audio device 10 may make the external object 20 or 30 vibrate to output a sound. For example, when attached on the table 20, the audio device 10 may make the table 20 vibrate to output music. For another example, when attached to the wall 30, the audio device 10 may make the wall 30 vibrate to output music.

Because the audio device 10 according to the comparison example makes the external object 20 or 30 vibrate without regard to a characteristic of the external object 20 or 30, the output sound may vary with the external object 20 or 30. For example, because the table 20 and the wall 30 differ in material, density, strength, or the like from each other, although the audio device 10 makes the table 20 and the wall 30 vibrate using the same frequency, the sounds output from the table 20 and the wall 30 may differ from each other.

Referring to FIG. 1B, an audio device 100 according to an embodiment of the disclosure may receive a first audio signal from an external electronic device 40 (e.g., a smartphone). For example, the audio device 100 may be connected with the external electronic device 40 in a wired or wireless manner and may receive the first audio signal through a specified communication protocol (e.g., Bluetooth).

The audio device 100 may be attached to the external object 20 or 30. The audio device 100 may make the external object 20 or 30 vibrate to output a sound corresponding to the first audio signal. For example, when attached on the table 20, the audio device 100 may make the table 20 vibrate to output music. For another example, when attached to the wall 30, the audio device 100 may make the wall 30 vibrate to output music.

The audio device 100 according to an embodiment of the disclosure may differently make the external object 20 or 30 vibrate depending on the attached surface. For example, when attached on the table 20 and when attached to the wall 30, the audio device 100 may make the table 20 and the wall 30 vibrate with regard to characteristics of the table 20 and the wall 30. Thus, the first audio signal received from the external electronic device 40 may be output through the table 20 and the wall 30 in almost the same manner. According to an embodiment of the disclosure, the audio device 100 may differently make the external object 20 or 30 vibrate depending on the attached surface.

Figure 2:
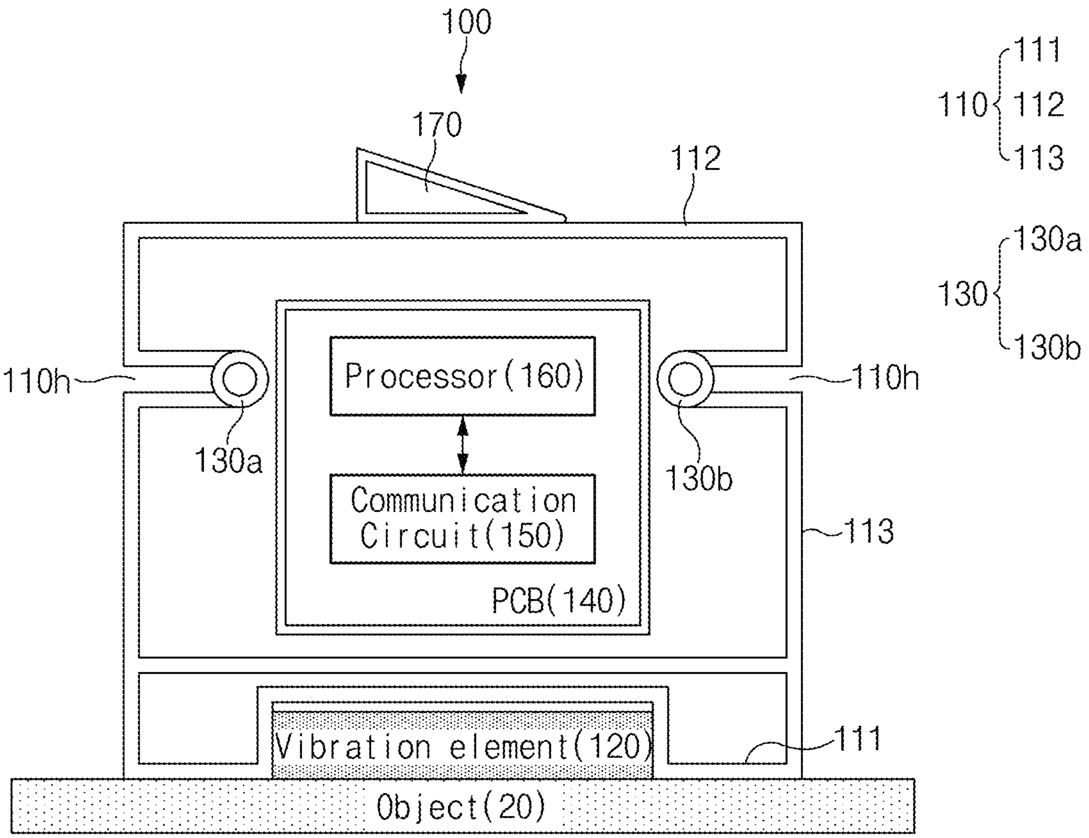
FIG. 2 illustrates a cross-sectional view of an audio device according to an embodiment.

FIG. 2 illustrates a cross-sectional view of an audio device according to an embodiment. FIG. 2 illustrates cross section A-A' of the audio device 100 shown in FIG. 1B.

Referring to FIG. 2, the audio device 100 may include a housing 110, a vibration element 120, microphones 130*a* and 130*b*, a PCB 140, a communication circuit 150, a processor 160, and a switch 170.

The housing 110 may form the appearance of the audio device 100 to protect various components included in the audio device 100 from an external impact.

According to an embodiment the housing 110 may include a first surface 111, a second surface 112 opposite to the first surface 111, and a side surface 113 which surrounds a space between the first surface 111 and the second surface 112. The first surface 111 may refer to a surface which is in indirect contact with an external object 20 or 30 or is attached to the external object 20 or 30. In FIG. 2, it is shown that the housing 110 includes the first surface 111, the second surface 112, and the side surface 113 for convenience of description. However, the housing 110 may be a cylindrical member.

The vibration element 120 may be disposed on the first surface 111. When the audio device 100 is attached to the external object 20 or 30, the vibration element 120 may also be attached to the external object 20 or 30. The vibration element 120 may make the external object 20 or 30 vibrate, such that a sound is generated from the external object 20 or 30. In the disclosure, the sound may be referred to as an analog signal.

The microphones 130*a* and 130*b* may be arranged in a groove 110*h* formed along the side surface 113 of the housing 110. The microphones 130*a* and 130*b* may obtain a sound generated from the external object 20 or 30. For example, when the vibration element 120 makes the external object 20 or 30 vibrate, the microphones 130*a* and 130*b* may obtain a sound generated from the external object 20 or 30.

The PCB 140 may be disposed in the housing 110. Various components included in the audio device 100 may be arranged on the PCB 140.

The communication circuit 150 may be disposed on the PCB 140. The communication circuit 150 may receive a first audio signal from an external electronic device 40. For example, the communication circuit 150 may be connected with the external electronic device 40 in a wired or wireless manner and may receive the first audio signal through a specified communication protocol (e.g., Bluetooth).

The processor 160 may be disposed on the PCB 140. When the audio device 100 is attached to the external object 20 or 30, the processor 160 may generate a second audio signal for making the vibration element 120 vibrate. The vibration element 120 may make the external object 20 or 30 vibrate based on the second audio signal. In the disclosure, the second audio signal may be referred to as a measurement signal or a test signal.

The processor 160 may control such that the microphones 130*a* and 130*b* obtain a third audio signal generated as the external object 20 or 30 vibrates. For example, as the vibration element 120 vibrates based on the second audio signal, the microphones 130*a* and 130*b* may obtain the sound generated from the external object 20 or 30. The processor 160 may change the sound obtained by the microphones 130*a* and 130*b* to the third audio signal which is a digital signal. Alternatively, the processor 160 may control such that the microphones 130*a* and 130*b* change the obtained sound to the third audio signal.

The processor 160 may compare the second audio signal with the third audio signal and may correct the first audio signal based on a deviation between the second audio signal and the third audio signal. The corrected first audio signal may be transmitted to the vibration element 120, and the vibration element 120 may vibrate the corrected first audio signal. When the vibration element 120 vibrates based on the corrected first audio signal, the external object 20 or 30 may also vibrate. Thus, an audio signal or a sound which is substantially the same as the first audio signal may be output from the external object 20 or 30.

According to an embodiment, the operation of correcting the first audio signal may be repeated whenever the external object 20 or 30 to which the audio device 100 is attached changes. For example, in a state where the audio device 100 is attached on the table 20, a user may detach the audio device 100 from the table 20 and may attach the audio device 100 to the wall 30. In this case, the processor 160 may make the wall 30 vibrate based on the second audio signal, and the microphones 130*a* and 130*b* may obtain the third audio signal generated from the wall 30. The processor 160 may correct the first audio signal based on the third audio signal generated from the wall 30. The processor 160 may make the vibration element 120 vibrate based on the corrected first audio signal. The external object 20 or 30 may also vibrate. An audio signal or a sound which is substantially the same as the first audio signal may be output from the external object 20 or 30.

Because the audio device 10 according to the comparison example makes the external object 20 or 30 vibrate without regard to a characteristic of the external object 20 or 30, the output sound may vary with the external object 20 or 30. However, the audio device 100 according to an embodiment of the disclosure may correct the audio signal received from the external electronic device 40 depending on the external object 20 or 30. Thus, irrespective of the external object 20 or 30, the audio device 100 may output an audio signal or a sound which is substantially the same as the audio signal received from the external electronic device 40.

The switch 170 may be attached to the housing 110. The user may select an operation mode of the audio device 100 by means of the switch 170. For example, the user may control such that the audio device 100 operates in an analysis mode or a playback mode by means of the switch 170. The analysis mode may refer to a mode where the audio device 100 corrects the first audio signal based on the second audio signal and the third audio signal. The playback mode may refer to a mode where the audio device 100 outputs the first audio signal.

Figure 3:
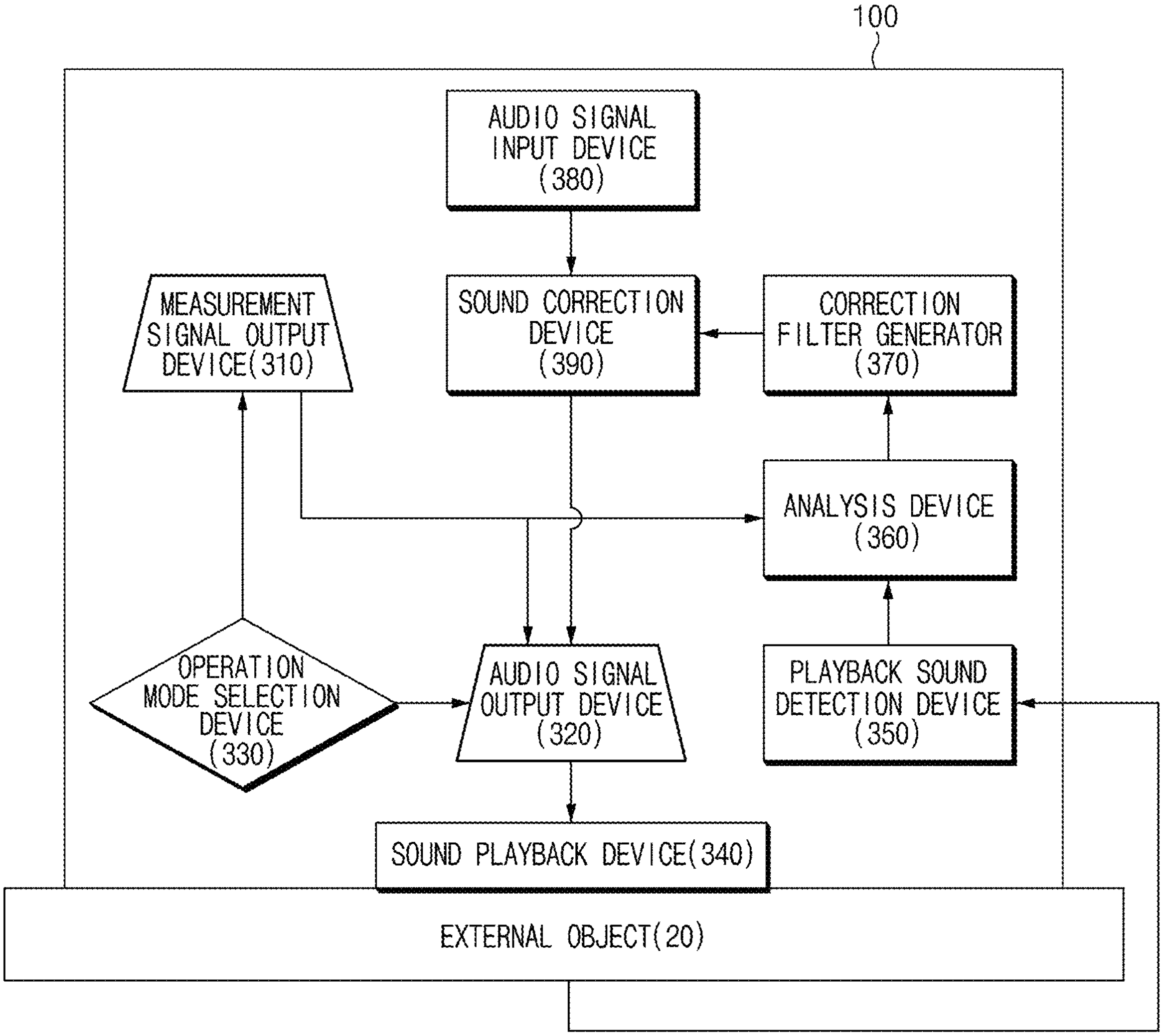
FIG. 3 illustrates a block diagram of an audio device according to an embodiment.

FIG. 3 is a block diagram of an audio device according to an embodiment.

Referring to FIG. 3, an audio device 100 may include a measurement signal output device 310, an audio signal output device 320, an operation mode selection device 330, a sound playback device 340, a playback sound detection device 350, an analysis device 360, a correction filter generator 370, an audio signal input device 380, and a sound correction device 390.

When the audio device 100 is attached to an external object 20 or 30 or when a user selects an analysis mode, the measurement signal output device 310 may generate a second audio signal. The second audio signal may be an audio signal for analyzing an attachment surface, which may be transmitted to the audio signal output device 320 and the analysis device 360.

The audio signal output device 320 may convert the second audio signal into an analog signal. The audio signal output device 320 may amplify and transmit the converted analog signal to the sound playback device 340.

According to an embodiment, the audio signal output device 320 may operate in the analysis mode or a playback mode based on data input from the operation mode selection device 330. For example, the operation mode selection device 330 may receive a user input for analyzing a characteristic of an attachment surface or playing a first audio signal from the user. The operation mode selection device 330 may transmit the user input to the audio signal output device 320. When the user input is the analysis mode for analyzing the characteristic of the attachment surface, the audio signal output device 320 may convert the second audio signal into an analog signal and may amplify and transmit the analog signal to the sound playback device 340. In the disclosure, the operation mode selection device 330 may be referred to as a switch 170.

The sound playback device 340 may convert the analog signal received from the audio signal output device 320 into vibration. When the sound playback device 340 vibrates, the external object 20 or 30 which is in contact with the sound playback device 340 may also vibrate. In the disclosure, the sound playback device 340 may be referred to as a vibration element 120.

According to an embodiment, the sound playback device 340 may convert the analog signal into vibration in a voice coil motor scheme and a piezoceramic scheme. For the voice coil motor scheme, current which flows in the voice coil and the Lorentz force by a magnetic field of the permanent magnet may be directly delivered to the attachment surface. For another example, the voice coil motor scheme may apply the Lorentz force to an object and may connect between the object and the attachment surface using a spring and a damper to indirectly move the attachment surface. The piezoceramic scheme may be a vibration scheme using a phenomenon in which voltage delivered to the piezoceramic element causes physical transformation of the element.

The playback sound detection device 350 may obtain the sound output as the external object 20 or 30 vibrates and may convert the sound into an audio signal (e.g., a third audio signal) in the form of pulse code modulation (PCM). The converted third audio signal may be transmitted to the analysis device 360. According to an embodiment, the playback sound detection device 350 may include a plurality of microphones 130*a* and 130*b* to accurately detect the sound output as the external object 20 or 30 vibrates. In the disclosure, the playback sound detection device 350 may be referred to as the microphones 130*a* and 130*b*.

The analysis device 360 may generate a transfer function based on the second audio signal received from the measurement signal output device 310 and the third audio signal received from the playback sound detection device 350. The transfer function may be obtained by performing deconvolution of the second audio signal and the third audio signal. The analysis device 360 may transmit the transfer function to the correction filter generator 370.

The correction filter generator 370 may generate a filter coefficient based on the transfer function received from the analysis device 360. The filter coefficient may refer to a coefficient of a digital audio filter capable of smoothing a frequency characteristic of the transfer function. The correction filter generator 370 may transmit the filter coefficient to the sound correction device 390.

The audio signal input device 380 may receive the first audio signal from the external electronic device 40. For example, the audio signal input device 380 may be connected with the external electronic device 40 in a wired or wireless manner and may receive the first audio signal through a specified communication protocol (e.g., Bluetooth). The audio signal output device 380 may transmit the first audio signal to the sound correction device 390.

The sound correction device 390 may correct the first audio signal based on the filter coefficient. The sound correction device 390 may transmit the corrected first audio signal to the audio signal output device 320.

The audio signal output device 320 may convert the corrected first audio signal into an analog signal. The audio signal output device 320 may amplify and transmit the converted analog signal to the sound playback device 340.

According to an embodiment, the audio signal output device 320 may operate in the analysis mode or the playback mode based on data input from the operation mode selection device 330. For example, when the user input is the playback mode for outputting the first audio signal, the audio signal output device 320 may convert the corrected first audio signal into an analog signal and may amplify and transmit the analog signal to the sound playback device 340.

The sound playback device 340 may convert the analog signal received from the audio signal output device 320 into vibration. When the sound playback device 340 vibrates, the external object 20 or 30 which is in contact with the sound playback device 340 may also vibrate. Thus, an audio signal or a sound which is substantially the same as the first audio signal may be output through the external object 20 or 30.

Because an audio device 10 according to a comparison example makes the external object 20 or 30 vibrate without regard to a characteristic of the external object 20 or 30, the output sound may vary with the external object 20 or 30. However, the audio device 100 according to an embodiment of the disclosure may correct the audio signal received from the external electronic device 40 depending on the external object 20 or 30. Thus, irrespective of the external object 20 or 30, the audio device 100 may output an audio signal or a sound which is substantially the same as the audio signal received from the external electronic device 40.

In the disclosure, the contents described in FIGS. 1 to 3 are also applicable to the components having the same reference numerals as the audio device 100 shown in FIGS. 1 to 3.

Figure 4:
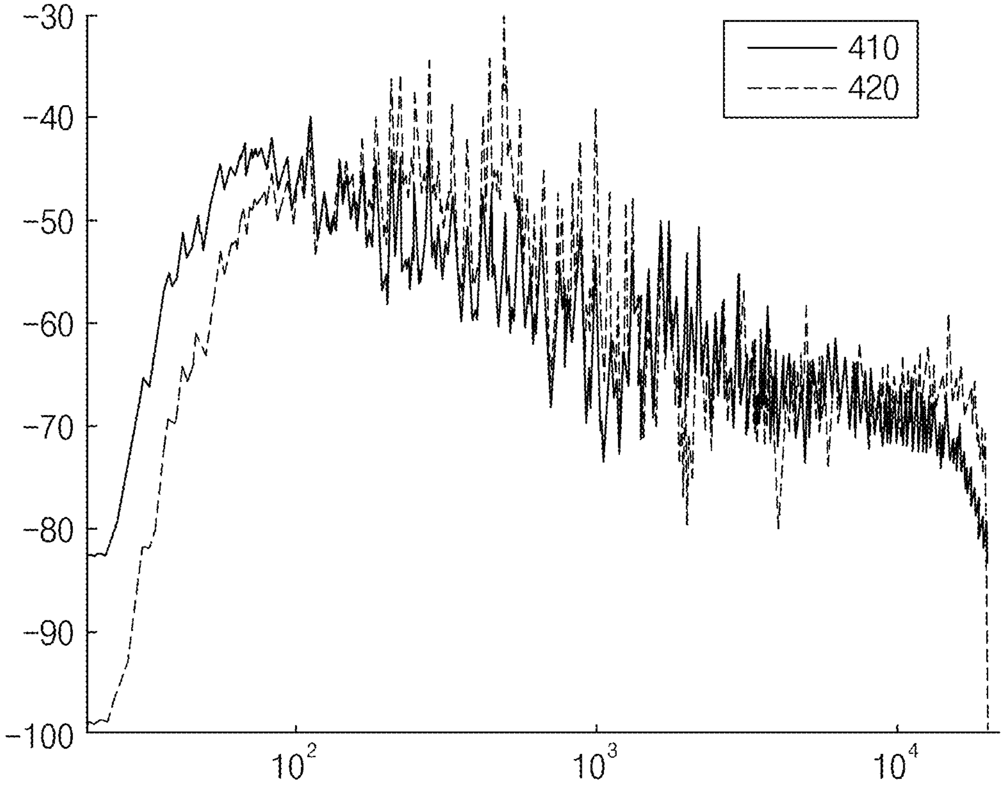
FIG. 4 illustrates a first audio signal and an output signal of an audio device according to a comparison example.

FIG. 4 illustrates a first audio signal and an output signal of an audio device according to a comparison example.

Referring to FIG. 4, a first graph 410 indicates a first audio signal received from an external electronic device 40. A second graph 420 indicates a signal output from an external object 20 or 30 as an audio device 10 according to the comparison example makes the external object 20 or 30 vibrate. The audio device 10 according to the comparison example may make the external object 20 or 30 vibrate without regard to a characteristic of the external object 20 or 30. In other words, the audio device 10 may change the first audio signal to an analog signal without a process of correcting the first audio signal and may make the external object 20 or 30 vibrate based on the analog signal. Thus, an error generated between the first audio signal and the signal output from the external object 20 or 30 may be very large as shown in FIG. 4.

Figure 5:
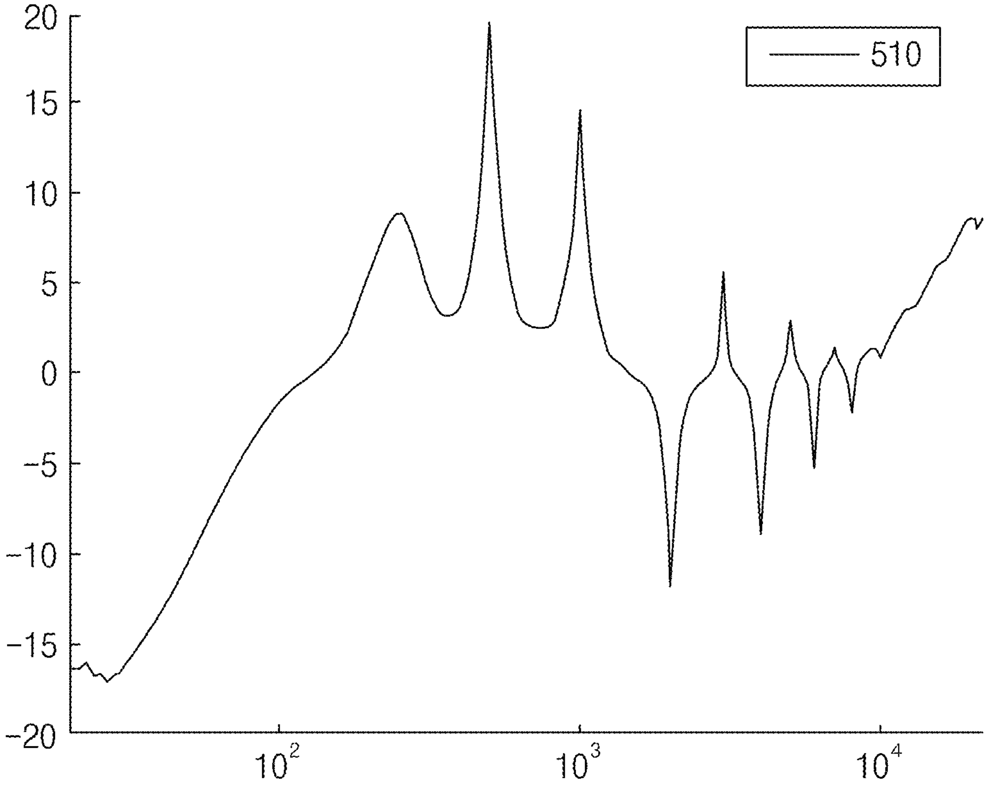
FIG. 5 illustrates a transfer function according to an embodiment of the disclosure.
Figure 6:
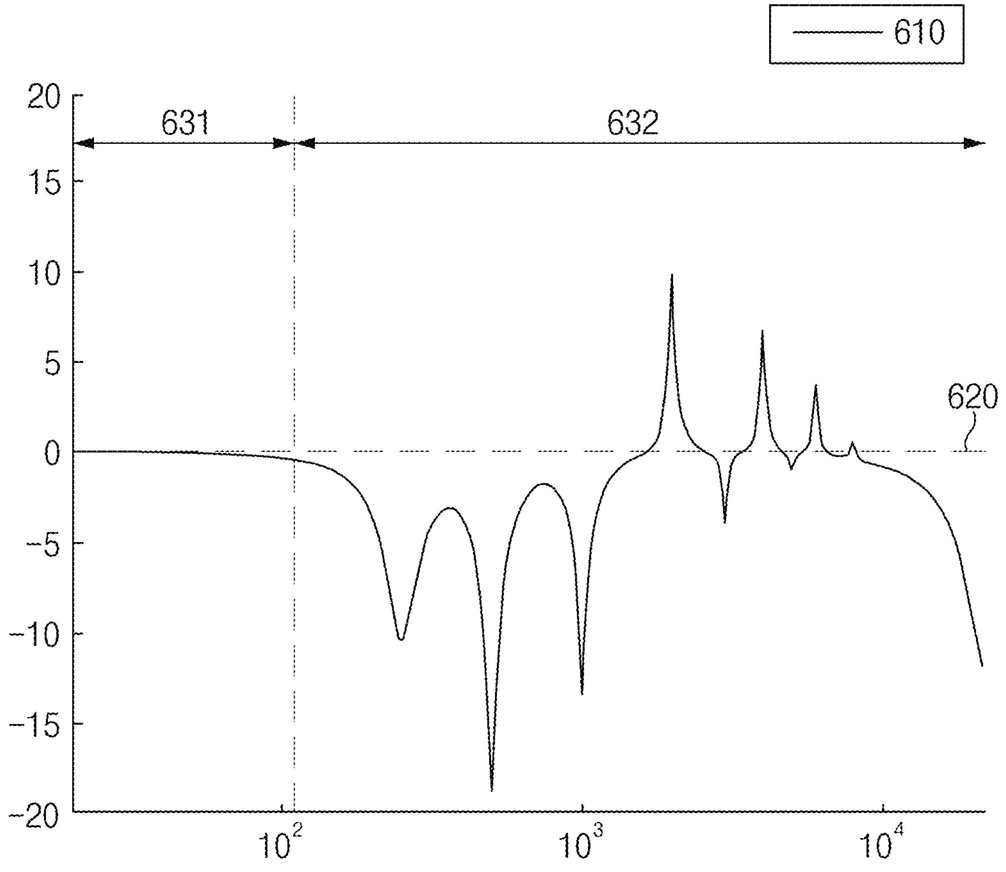
FIG. 6 illustrates a filter coefficient according to an embodiment of the disclosure.

FIG. 5 illustrates a transfer function according to an embodiment of the disclosure. FIG. 6 illustrates a filter coefficient according to an embodiment of the disclosure. A graph 510 of FIG. 5 may refer to a transfer function generated by an analysis device 360 of FIG. 3, and a graph 610 of FIG. 6 may refer to a filter coefficient generated by a correction filter generator 370 of FIG. 3.

Referring to FIG. 5, an audio device 100 may perform deconvolution of a second audio signal and a third audio signal to generate a transfer function. Particularly, when the third audio signal is a signal obtained from a plurality of microphones **130*a* and 130*b*, the audio device 100** may generate a transfer function with the smallest error from each input by means of the least square method.

Referring to FIG. 6, the audio device 100 may calculate a correction coefficient based on the transfer function. For example, the audio device 100 may change the transfer function with respect to a 0-axis 620. In other words, a transfer function having a plus value with respect to the 0-axis 620 may change to have a minus value, and a transfer function having a minus value may change to have a plus value. According to an embodiment, the audio device 100 may change only a transfer function of a specific frequency interval. For example, the audio device 100 may change a value of a transfer function of a second frequency interval 632 with respect to the 0-axis 620, without changing a transfer function of a first frequency interval 631.

Figure 7:
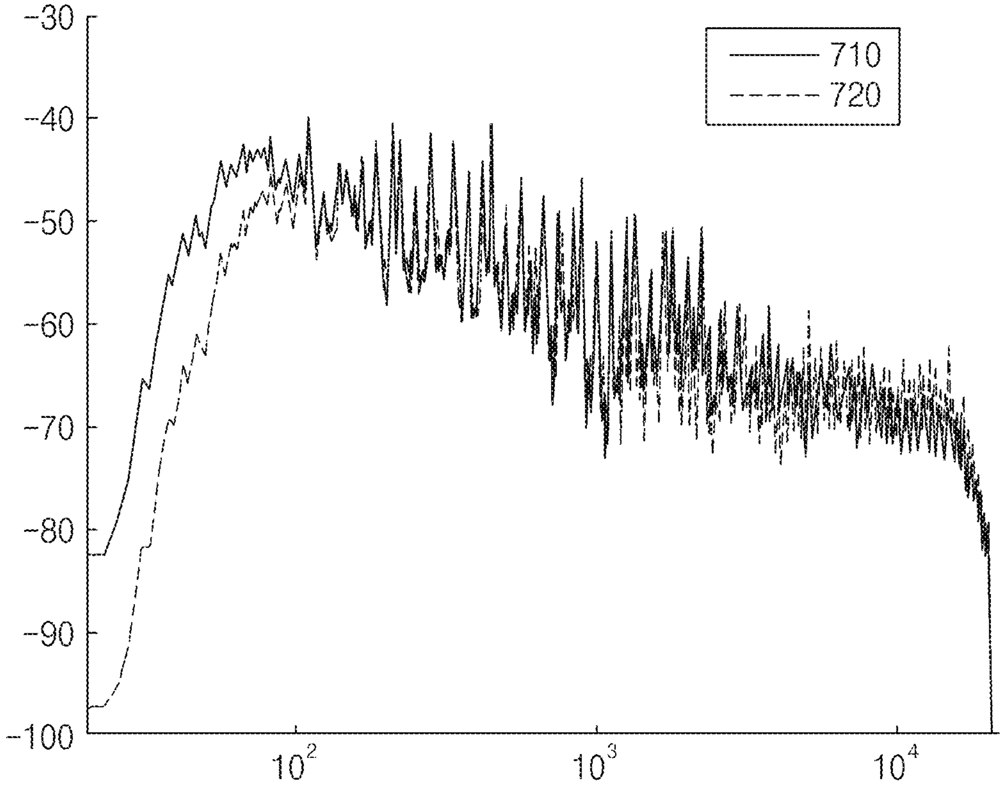
FIG. 7 illustrates a first audio signal and an output signal of an audio device according to an embodiment of the disclosure.

FIG. 7 illustrates a first audio signal and an output signal of an audio device according to an embodiment of the disclosure.

Referring to FIG. 7, a first graph 710 indicates a first audio signal received from an external electronic device 40. A second graph 720 indicates a signal output from an external object 20 or 30 as an audio device 100 according to an embodiment of the disclosure makes the external object 20 or 30 vibrate. The audio device 100 according to an embodiment of the disclosure makes the external object 20 or 30 vibrate with regard to a characteristic of the external object 20 or 30. In other words, the audio device 100 according to an embodiment of the disclosure may correct a first audio signal depending on the external object 20 or 30 and may change the corrected first audio signal into an analog signal. Furthermore, the audio device 100 according to an embodiment of the disclosure may make the external object 20 or 30 vibrate based on the analog signal. Thus, the first audio signal and the signal output from the external object 20 or 30 may be almost identical to each other as shown in FIG. 7.

An audio device according to an embodiment disclosed in the disclosure may include a housing including a first surface, a second surface opposite to the first surface, and a side surface surrounding a space between the first surface and the second surface, a vibration element disposed on the first surface, a microphone configured to obtain a sound generated as the vibration element makes an external object vibrate, a PCB disposed in the housing, a processor disposed on the PCB, and a communication circuit configured to be electrically connected with the processor and receive a first audio signal from an external electronic device. The processor may generate a second audio signal, such that the vibration element makes the external object vibrate, when the vibration element is attached to the external object, may allow the microphone to obtain a third audio signal generated as the external object vibrates, may correct the first audio signal based on a deviation between the second audio signal and the third audio signal, and may allow the vibration element to make the external object vibrate based on the corrected first audio signal.

The processor according to an embodiment disclosed in the disclosure may generate a transfer function by performing deconvolution of the second audio signal and the third audio signal.

The processor according to an embodiment disclosed in the disclosure may convert a domain corresponding to a specific frequency band in the transfer function and may correct the first audio signal based on the converted domain.

The audio device according to an embodiment disclosed in the disclosure may further include a switch configured to select any one of an analysis mode for correcting the first audio signal and a playback mode for making the vibration element vibrate based on the corrected first audio signal.

The housing according to an embodiment disclosed in the disclosure may include a groove formed along the side surface. The microphone may be disposed in the groove.

The processor according to an embodiment disclosed in the disclosure may allow the microphone to change an analog signal generated as the external object vibrates to obtain the third audio signal.

The third audio signal according to an embodiment disclosed in the disclosure may correspond to pulse code modulation (PCM) data.

The vibration element according to an embodiment disclosed in the disclosure may include a motor. The motor may vibrate based on the second audio signal.

The communication circuit according to an embodiment disclosed in the disclosure may receive the first audio signal from the external electronic device through a specified communication protocol.

An audio device according to an embodiment disclosed in the disclosure may include a housing including a first surface, a second surface opposite to the first surface, and a side surface surrounding a space between the first surface and the second surface, a vibration element disposed on the first surface, a microphone configured to obtain a sound generated as the vibration element makes an external object vibrate, a PCB disposed in the housing, a processor disposed on the PCB, a communication circuit configured to be electrically connected with the processor and receive a first audio signal from an external electronic device, and an operation mode selection device configured to obtain a user input. The processor may generate a second audio signal, such that the vibration element makes the external object vibrate, when the user input corresponds to an analysis mode for correcting the first audio signal, may allow the microphone to obtain a third audio signal generated as the external object vibrates, may correct the first audio signal based on a deviation between the second audio signal and the third audio signal, and may allow the vibration element to make the external object vibrate based on the corrected first audio signal.

The processor according to an embodiment disclosed in the disclosure may make the vibration element vibrate based on the corrected first audio signal, when the user input corresponds to a playback mode for outputting the first audio signal.

The operation mode selection device according to an embodiment disclosed in the disclosure may be disposed on the second surface of the housing.

The processor according to an embodiment disclosed in the disclosure may generate a transfer function by performing deconvolution of the second audio signal and the third audio signal.

The processor according to an embodiment disclosed in the disclosure may generate a filter coefficient by smoothing a frequency characteristic of the transfer function.

The processor according to an embodiment disclosed in the disclosure may correct the first audio signal based on the filter coefficient.

The processor according to an embodiment disclosed in the disclosure may allow the microphone to change an analog signal generated as the external object vibrates to obtain the third audio signal.

The vibration element according to an embodiment disclosed in the disclosure may include a motor. The motor may vibrate based on the second audio signal.

The communication circuit according to an embodiment disclosed in the disclosure may receive the first audio signal from the external electronic device through a specified communication protocol.

A method for playing an audio signal according to an embodiment disclosed in the disclosure may include receiving a first audio signal, generating a second audio signal and controlling such that a vibration element makes an external object vibrate, when the vibration element is attached to the external object, obtaining a third audio signal generated as the external object vibrates, correcting the first audio signal based on a deviation between the second audio signal and the third audio signal, and controlling such that the vibration element makes the external object vibrate based on the corrected first audio signal.

The method according to an embodiment disclosed in the disclosure may further include changing a sound generated as the external object vibrates to the third audio signal.

The audio device according to various embodiments may be one of various types of devices. The audio devices may include, for example, a portable multimedia device, a portable audio device, or a home appliance. According to an embodiment of the disclosure, the audio devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software including one or more instructions that are stored in a storage medium that is readable by a machine. For example, a processor of the machine may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An audio device, comprising:

a housing including a first surface, a second surface opposite to the first surface, and a side surface surrounding a space between the first surface and the second surface;

a vibration element disposed on the first surface;

a microphone configured to obtain a sound generated as the vibration element makes an external object vibrate;

a printed circuit board (PCB) disposed in the housing;

a processor disposed on the PCB; and a communication circuit configured to be electrically connected with the processor and receive a first audio signal from an external electronic device, wherein the processor is configured to:

generate a second audio signal, such that the vibration element makes the external object vibrate, when the vibration element is attached to the external object;

allow the microphone to obtain a third audio signal generated as the external object vibrates;

generate a transfer function by performing deconvolution of the second audio signal and the third audio signal;

convert a domain corresponding to a specific frequency band in the transfer function and correct the first audio signal based on the converted domain; and allow the vibration element to make the external object vibrate based on the corrected first audio signal.

2. The audio device of claim 1, further comprising:

a switch configured to select any one of an analysis mode for correcting the first audio signal and a playback mode for making the vibration element vibrate based on the corrected first audio signal.

3. The audio device of claim 1, wherein the housing includes a groove formed along the side surface, and wherein the microphone is disposed in the groove.

4. The audio device of claim 1, wherein the processor allows the microphone to change an analog signal generated as the external object vibrates to obtain the third audio signal.

5. The audio device of claim 4, wherein the third audio signal corresponds to pulse code modulation (PCM) data.

6. The audio device of claim 1, wherein the vibration element includes a motor, and wherein the motor vibrates based on the second audio signal.

7. The audio device of claim 1, wherein the communication circuit receives the first audio signal from the external electronic device through a specified communication protocol.

8. An audio device, comprising:

a housing including a first surface, a second surface opposite to the first surface, and a side surface surrounding a space between the first surface and the second surface;

a vibration element disposed on the first surface;

a microphone configured to obtain a sound generated as the vibration element makes an external object vibrate;

a printed circuit board (PCB) disposed in the housing;

a processor disposed on the PCB;

a communication circuit configured to be electrically connected with the processor and receive a first audio signal from an external electronic device; and an operation mode selection device configured to obtain a user input, wherein the processor is configured to:

generate a second audio signal, such that the vibration element makes the external object vibrate, when the user input corresponds to an analysis mode for correcting the first audio signal;

allow the microphone to obtain a third audio signal generated as the external object vibrates;

generate a transfer function by performing deconvolution of the second audio signal and the third audio signal;

convert a domain corresponding to a specific frequency band in the transfer function and correct the first audio signal based on the converted domain; and allow the vibration element to make the external object vibrate based on the corrected first audio signal.

9. The audio device of claim 8, wherein the processor makes the vibration element vibrate based on the corrected first audio signal, when the user input corresponds to a playback mode for outputting the first audio signal.

10. The audio device of claim 8, wherein the operation mode selection device is disposed on the second surface of the housing.

11. The audio device of claim 8, wherein the processor generates a transfer function by performing deconvolution of the second audio signal and the third audio signal.

12. A method for playing an audio signal, the method comprising:

receiving a first audio signal;

generating a second audio signal and controlling such that a vibration element makes an external object vibrate, when the vibration element is attached to the external object;

obtaining a third audio signal generated as the external object vibrates;

generating a transfer function by performing deconvolution of the second audio signal and the third audio signal;

converting a domain corresponding to a specific frequency band in the transfer function and correcting the first audio signal based on the converted domain; and controlling such that the vibration element makes the external object vibrate based on the corrected first audio signal.

13. The method of claim 12, further comprising:

changing a sound generated as the external object vibrates to the third audio signal.

* * * * *